(12) United States Patent
Gupta et al.

(10) Patent No.: US 11,010,068 B2
(45) Date of Patent: May 18, 2021

(54) GPT-BASED MULTI-LOCATION DATA SECURITY SYSTEM

(71) Applicant: Dell Products L.P., Round Rock, TX (US)

(72) Inventors: Chitrak Gupta, Karnataka (IN); Shekar Babu Suryanarayana, Karnataka (IN)

(73) Assignee: Dell Products L.P., Round Rock, TX (US)

(*) Notice: Subject to any disclaimer, the term of this patent is extended or adjusted under 35 U.S.C. 154(b) by 52 days.

(21) Appl. No.: 16/258,282

(22) Filed: Jan. 25, 2019

(65) Prior Publication Data

US 2020/0241767 A1 Jul. 30, 2020

(51) Int. Cl.
*G06F 3/06* (2006.01)
*G06F 21/78* (2013.01)
*G06F 12/14* (2006.01)

(52) U.S. Cl.
CPC .......... *G06F 3/0622* (2013.01); *G06F 3/067* (2013.01); *G06F 3/0637* (2013.01); *G06F 3/0644* (2013.01); *G06F 12/1408* (2013.01); *G06F 21/78* (2013.01); *G06F 2212/1052* (2013.01); *G06F 2212/402* (2013.01)

(58) Field of Classification Search
None
See application file for complete search history.

(56) References Cited

U.S. PATENT DOCUMENTS

| | | | |
|---|---|---|---|
| 2008/0052331 A1* | 2/2008 | Ogawa | G06F 3/0605 |
| 2011/0277038 A1* | 11/2011 | Sahita | G06F 21/6281 726/27 |
| 2020/0034041 A1* | 1/2020 | Zhang | G06F 11/1456 |

* cited by examiner

Primary Examiner — Charles J Choi
(74) Attorney, Agent, or Firm — Haynes and Boone, LLP (57) ABSTRACT

A GPT-based multi-location data security system includes a first server device coupled to a second server device through a network. The first server device includes a storage device that includes a GPT that identifies a data storage partition on the storage device that stores data, and that includes a security tag that identifies security requirements for the data stored on the data storage partition. A multi-location data security subsystem in the first server device is coupled to the storage device. The multi-location data security subsystem receives a request to transfer the data stored on the data storage partition to the second server device, and determines whether the second server device satisfies the security requirements for the data stored on the data storage partition. If the second server device satisfies the security requirements identified in the security tag, the first server device transfer the data to the second server device.

20 Claims, 4 Drawing Sheets

GPT-BASED MULTI-LOCATION DATA SECURITY SYSTEM

BACKGROUND

The present disclosure relates generally to information handling systems, and more particularly to securing data as it is stored across different information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Many information handling systems such as, for example, server systems in datacenters, may employ enhanced security by locking managed devices within the server system with device locking keys. For example, for many server systems in datacenters, network-based key management systems have been developed to provide for the centralized management of storage device locking keys used to lock storage devices in the server systems in order to protect the data stored thereon, with the server systems configured to retrieve those storage device locking keys via in-band methods (e.g., using operating system services provided via an application or agent running in the operating system on the server system) or out-of-band methods (e.g., via a remote access controller that operates independently of the operating system and uses a dedicated network connection to the key management system that is separate from that used by the operating system), and use those storage device locking keys to unlock storage devices in order to access the data stored thereon. However, the locking of storage devices via storage device locking keys can raise issues.

For example, storage devices such as Self Encrypting Drives (SEDs) operate to encrypt data for storage. However, when data is moved between storage devices in datacenter(s), that data may be stored on a non-secure storage device, as providing the same amount of security in all storage devices in and across datacenters can be difficult and expensive using conventional techniques. As such, data stored at a source storage location may be highly secure, and may be moved to a destination storage location where it is under the risk of a security breach due to vulnerabilities (e.g., a lack of enabled security features) at the destination storage location. Conventional systems utilize encryption/decryption for moving data between storage locations, which requires a destination application to decrypt that data before accessing it, along with the use of encryption/decryption keys for doing so.

Accordingly, it would be desirable to provide an improved data security system.

SUMMARY

According to one embodiment, an Information Handling System (IHS) includes at least one processing system; and at least one memory system that is coupled to the at least one processing system and that include instruction that, when executed by the at least one processing system, cause the at least one processing system to perform operations including: receiving a request to transfer data that is stored on a data storage partition identified by Globally Unique Identifier (GUID) Partition Table (GPT) to a server device; determining whether the server device satisfies security requirements for the data stored on the data storage partition that are identified by a security tag included in the GPT; and transferring, in response to determining that the server device satisfies the security requirements identified in the security tag, the data to the server device.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
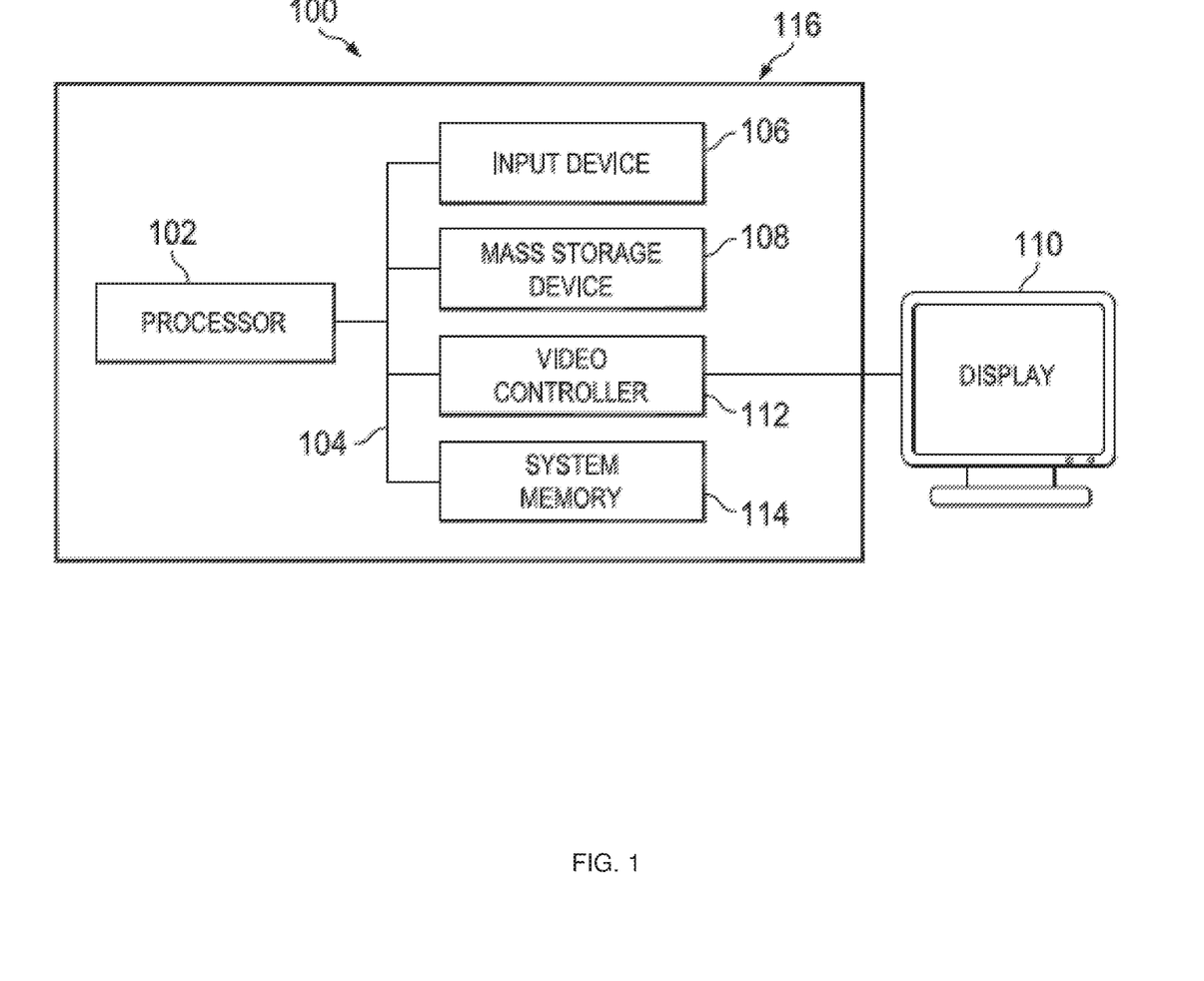
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
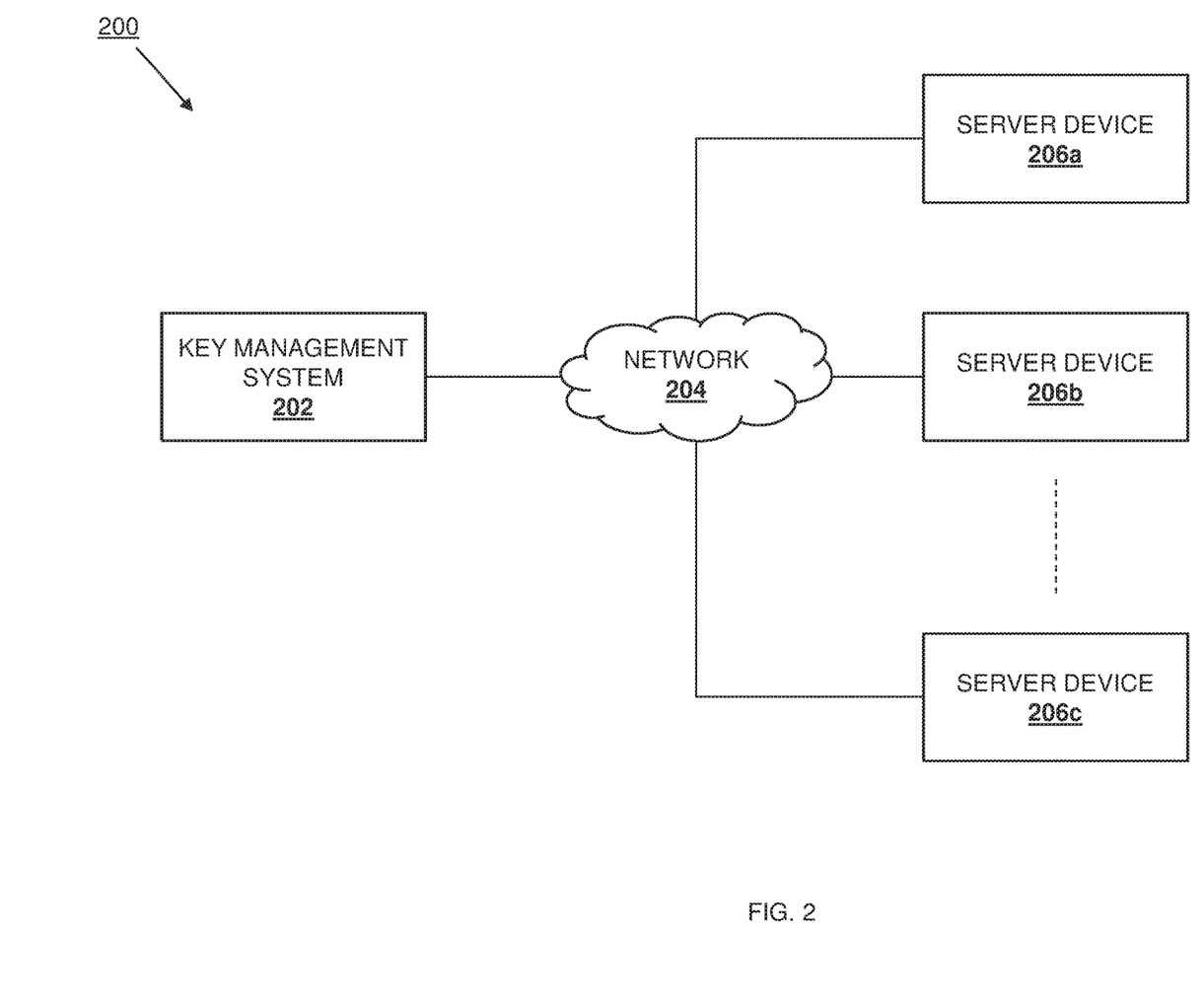
FIG. 2 is a schematic view illustrating an embodiment of a GPT-based multi-location data security system.

Referring now to FIG. 2, an embodiment of a Globally Unique Identifier (GUID) Partition Table (GPT) multi-location data security system 200 is illustrated. As discussed below, the GPT multi-location data security system 200 includes a management system that may be provided by one or more of the IHSs 100 discussed above with reference to FIG. 1, and/or that may include any or all of the components of the IHS 100. In the illustrated embodiment, the management system is provided by a key management system 202 that may include one or more server devices, although other computing devices may be utilized to provide the management system while remaining within the scope of the present disclosure as well. In a specific example, the key management system 202 includes one or more server devices that are configured according to the Key Management Interoperability Protocol (KMIP), with the key management system 202 configured to operate as a KMIP server. One of skill in the art in possession of the present disclosure will recognize that the KMIP is an extensible communication protocol that defines message formats for the manipulation of cryptographic keys via server device(s) providing the key management server system 202, which facilitates data encryption by simplifying encryption key management. As such, keys may be created on a server and then retrieved, possibly wrapped by other keys, with both symmetric and asymmetric keys supported, and including the ability to sign certificates. One of skill in the art in possession of the present disclosure will recognize that the KMIP also allows for KMIP clients to ask a KMIP server to encrypt or decrypt data, without needing direct access to the key. However, while a specific protocol is discussed herein as being utilized by the GPT multi-location data security system 200, one of skill in the art in possession of the present disclosure will recognize that keys may be managed according to the teachings of the present disclosure via a variety of key management protocols while remaining within the scope of the present disclosure as well.

In the illustrated embodiment, the key management system 202 is coupled to a network 204 that may be provided by a Local Area Network (LAN), the Internet, and/or any other network that would be apparent to one of skill in the art in possession of the present disclosure. Furthermore, a plurality of managed systems may be coupled to the management system of the present disclosure via the network 204. In an embodiment, any or all of the managed systems may be provided by the IHS 100 discussed above with reference to FIG. 1, and/or may include any or all of the components of the IHS 100. For example, in the illustrated embodiment, the managed systems are provided by server devices 206a, 206b, and up to 206c, each of which is coupled through the network 204 to the key management system 202. In embodiments in which the key management system 202 is configured to operate as a KMIP server, each of the server devices 206a-c may be configured to operate as KMIP clients. While one of skill in the art in possession of the present disclosure will recognize that the embodiment discussed below describe a datacenter including a datacenter network that couples together the key management system and the server devices, any of a variety of managed systems may be coupled to a management system via a network while operating according to the teachings of the present disclosure, and those embodiments are envisioned as falling within the scope of the present disclosure as well. In particular, some of the embodiments discussed below may operate across datacenters, with each respective datacenter provided as illustrated in FIG. 2, and the network 204 allowing communication across those datacenters.

Figure 3:
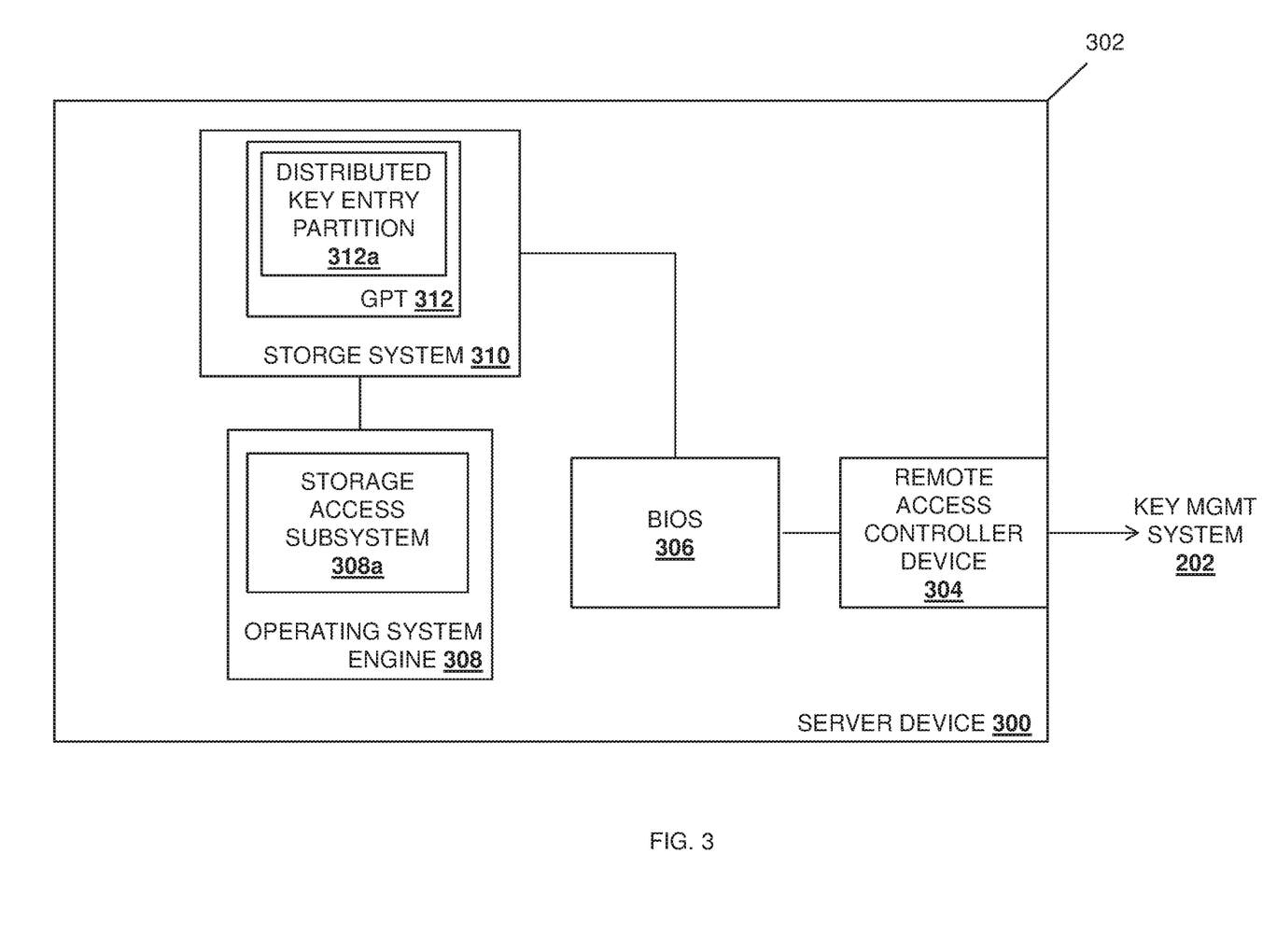
FIG. 3 is a schematic view illustrating an embodiment of a server device provided in the GPT-based multi-location data security system of FIG. 2.

Referring now to FIG. 3, an embodiment of a managed system provided by a server device 300 is illustrated. The server device 300 may be any or all of the server devices 206a-c discussed above with reference to FIG. 2 and, as such, may be provided by the IHS 100 discussed above with reference to FIG. 1, and/or may include any or all of the components of the IHS 100. In the illustrated embodiment, the server device 300 includes a chassis 302 that houses the components of the server device 300, only some of which are illustrated in FIG. 3. In the illustrated embodiment, the chassis 302 may house at least one processing system (not illustrated, but which may include the processor 102 discussed above with reference to FIG. 1) and at least one memory system (not illustrated, but which may include the memory 114 discussed above with reference to FIG. 1) that is coupled to the at least one processing system and that includes instructions that, when executed by the at least one processing system, cause the at least one processing system to provide at least one multi-location data security subsystem that is configured to perform the functionality of the multi-location data security subsystems discussed below.

For example, in the illustrated embodiment, the chassis 302 houses a remote access controller device 304 that may provide at least a portion of the multi-location data security subsystem discussed above. In a specific example, the remote access controller device 304 may be provided by, for example, an integrated DELL® Remote Access Controller (iDRAC®) available from DELL® Inc. of Round Rock, Texas, United States. As would be understood by one of skill in the art in possession of the present disclosure, remote access controller devices may provide an out-of-band management platform for server systems (e.g., via a separate expansion card, or integrated into the main circuit board as with the iDRAC® discussed above), and may operate using remote access controller resources that are separate from the server resources utilized by the server system, while providing a browser-based-interface and/or command-line-interface for allowing users to manage and monitor the server system. As discussed below, the remote access controller device 304 may include a remote access controller processing system (not illustrated, but which may include the processor 102 discussed above with reference to FIG. 1) and a remote access controller memory system (not illustrated, but which may include the memory 114 discussed above with reference to FIG. 1) that is coupled to the remote access controller processing system and that includes instructions that, when executed by the remote access controller processing system, cause the remote access controller processing system to provide the remote access controller that is configured to perform the functionality of the remote access controllers discussed below. Furthermore, FIG. 3 illustrates how the remote access controller device 304 provides a communication connection (e.g., via the network 204 of FIG. 2) to the key management system 202 of FIG. 2.

In the illustrated embodiment, the chassis 302 also houses a BIOS 306 that is coupled to the remote access controller 304 and that may provide a portion of the multi-location data security subsystem discussed above. As would be understood by one of skill in the art in possession of the present disclosure, a BIOS may be provided by non-volatile firmware and may be used to perform hardware initialization during a booting process (e.g., power-on startup) for the server device 300, as well as provide runtime services for operating systems and applications running on the managed server system 300. Furthermore, while discussed as a BIOS below, one of skill in the art in possession of the present disclosure will recognize that the BIOS 306 may be provided according to the Unified Extensible Firmware Interface (UEFI) specification, which defines a software interface between an operating system and platform firmware in the server device 300, and was provided to replace the BIOS firmware interface while providing legacy support for BIOS services. As discussed below, the BIOS 306 may include a BIOS processing system (not illustrated, but which may include the processor 102 discussed above with reference to FIG. 1 and/or components with similar processing functionality) and a BIOS memory system (not illustrated, but which may include the memory 114 discussed above with reference to FIG. 1 and/or components with similar memory functionality) that is coupled to the BIOS processing system and that includes instructions that, when executed by the BIOS processing system, cause the BIOS processing system to provide a BIOS engine that is configured to perform the functionality of the BIOS discussed below.

In the illustrated embodiment, the chassis 302 may also include an operating system (OS) processing system (not illustrated, but which may include the processor 102 discussed above with reference to FIG. 1 and/or components with similar processing functionality) and an OS memory system (not illustrated, but which may include the memory 114 discussed above with reference to FIG. 1 and/or components with similar memory functionality) that is coupled to the OS processing system and that includes instructions that, when executed by the OS processing system, cause the OS processing system to provide an OS, a storage access subsystem 308a, the OS applications discussed below, and/or any other OS components that would be apparent to one of skill in the art in possession of the present disclosure. A storage system 310 is coupled to each of the BIOS 306 (e.g., via a coupling to the BIOS processing system) and the OS engine 308 (e.g., via a coupling to the OS processing system), and includes a Globally Unique Identifier (GUID) Partition Table (GPT) 312. As would be understood by one of skill in the art in possession of the present disclosure, GPTs provide a standard for the layout of a partition table on a storage device used in server devices (e.g., a hard disk drive, a solid-state drive, etc.) using globally unique identifiers, and are part of the UEFI standard discussed above, but are also utilized with BIOSs due to the limitations of Master Boot Record (MBR) partition tables utilized by many conventional BIOSs. In the illustrated embodiment, the GPT 312 includes a distributed key entry partition 312a provided according to the teachings of the present disclosure, but one of skill in the art in possession of the present disclosure will recognize that GPTs may also include GPT headers, GPT entries, a plurality of data storage partitions, and/or a variety of GPT elements known in the art. However, while a specific server device 300 has been illustrated and described, one of skill in the art in possession of the present disclosure will recognize that server devices may include a variety of components and/or component configurations while remaining within the scope of the present disclosure as well.

Figure 4:
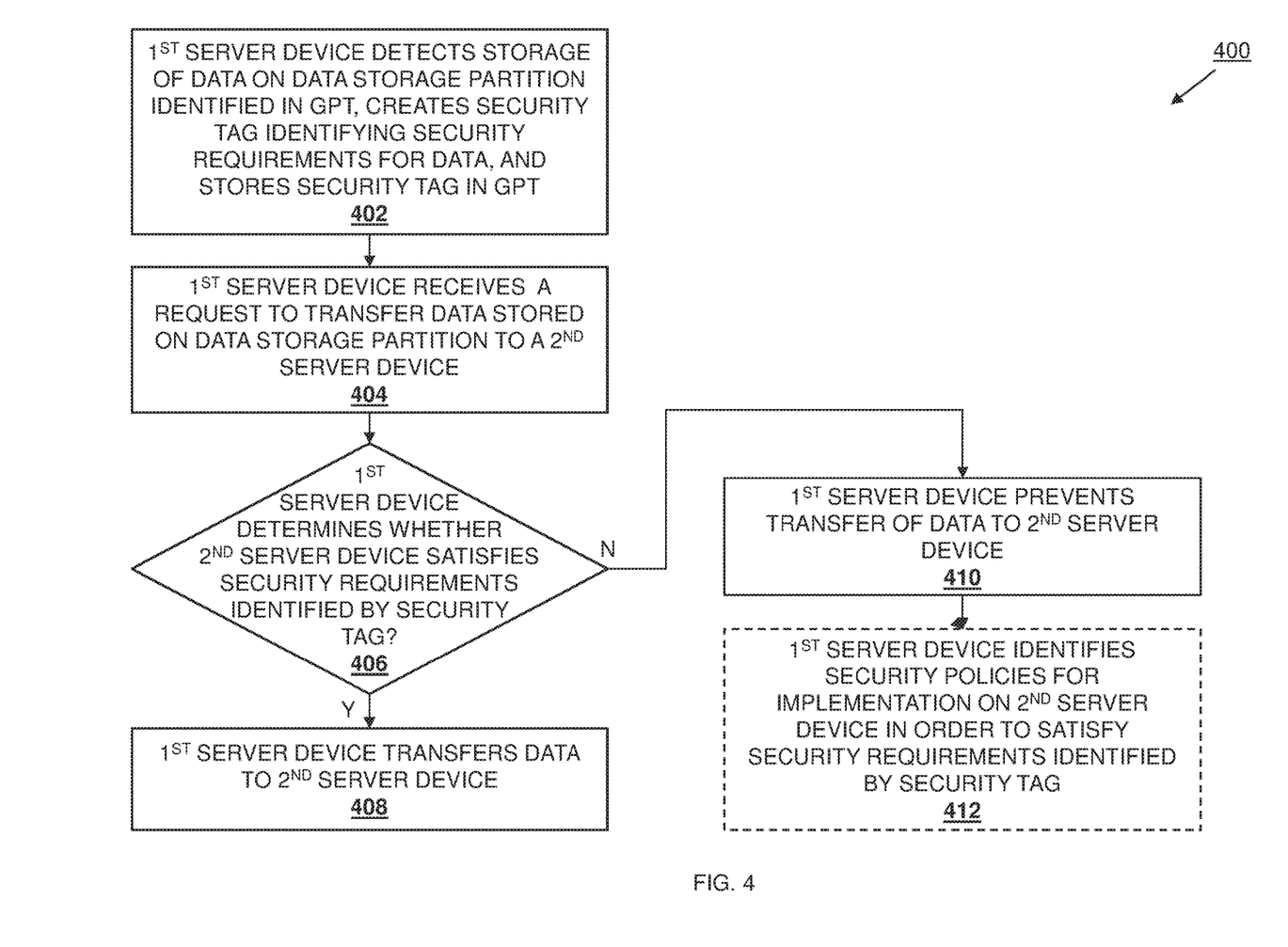
FIG. 4 is a flow chart illustrating an embodiment of a method for providing data security at multiple storage locations.

Referring now to FIG. 4, an embodiment of a method 400 for providing data security at multiple storage locations is illustrated. As discussed below, the systems and methods of the present disclosure ensures multi-storage-location data security for data included in files, data storage partitions, disks, and/or other data structures even when that data is moved between storage locations. A Globally Unique Identifier (GUID) Partition Table (GPT) may be provided in a storage system may include GPT entries that point to a GPT distributed key entry partition that may store a network security key (or information for retrieving a network security key) provided by a network-based key management system and a local security key (or information for retrieving a local security key) provided by a local key management subsystem, with the network security key and local security key used to secure the data stored on data storage partition that is include in the storage system and identified in the GPT. For example, when data is provided on data storage partitions that are included on the storage system and identified by the GPT, entries may be added to the GPT distributed key entry partition that are associated with network security key/local security key combinations, and that are indexed by a super block in the GPT (e.g., the first entry in the GPT). Each entry in the GPT distributed key entry partition may include a descriptor with attributes that index to the security keys that secure the data to provide multi-location data security. For example, such attributes may include pointers to local subsystems storing information for retrieving the local security keys used to secure the data, pointers to network subsystems storing information for retrieving network security keys used to secure the data, pointers to the secured data itself, security tags that indicate the security requirements for the secured data, and redundant data location hashes that indicate other storage locations of the secured data. The secured data may be secured for a particular level of security or for particular security requirements via the GPT and regardless of its storage location, which operates to prevent the transfer of that data to a storage system without that particular level of security or those particular security requirements, or the accessing of that data when stored on a storage system without that particular level of security or those particular security requirements, thus providing for multi-storage location data security via the use of as GPT.

The method 400 begins at block 402 where a first server device detects the storage of data on a data storage partition identified in a GPT, creates a security tag identifying security requirements for the data, and stores the security tag in the GPT. In an embodiment, at block 402, the operating system provided by the operating system engine 308 may operate to create data for storage on a data storage partition provided on the storage system 310. For example, the operating system may create a file or other data structure including data, and provide that data to the storage access subsystem 308a (e.g., provided by a disk block access subsystem) for storage on a data storage partition provided on the storage system 310 and identified in the GPT 312. In response to the storage of the data on the data storage partition provided on the storage system 310, the storage system 310 may operate to determine the security requirements for the data being stored, create a security tag identifying those security requirements, and store that security tag in the GPT 312. For example, the BIOS 306 may be provided per the UEFI, and may implement a distributed key management engine that is configured to manage and/or update security keys in the distributed key entry table at boot time, with call commands issued by BIOS 306 provided to the storage system 310 in order to update the storage system 310.

For example, in response to the storage of the data on the data storage partition provided by the storage system 310, the remote access controller provided by the remote access controller device 304 may retrieve, through the network 204 from the key management system 202, a network security key. While not described herein in detail, one of skill in the art in possession of the present disclosure will recognize how a remote access controller in a server device (e.g., acting as a KMIP client) may operate to retrieve a network security key from a key management system (e.g., acting as a KMIP server). In addition, the remote access controller device 304 may retrieve a local security key from a storage provided in the remote access controller device 304.

The remote access controller provided by the remote access controller device 304 may then pass the network security key and the local security key to the BIOS engine provided by the BIOS 306, and the BIOS engine may use the network security key and/or the local security key to secure the data stored in the data storage partition provided on the storage system 310. For example, some security policies may provide for the caching of local security keys via the remote access controller device 304 when the remote access controller device 304 manages the security of the data, while other security policies may provide for the retrieval of network security keys via the key management system 202 when the key management system 202 manages the security of the data.

In addition, the BIOS engine may generate an entry in the distributed key entry partition 312a identified in the GPT 312 with information about the network security key and the local security key, and that entry in the distributed key entry partition 312a may be indexed via a super block in the GPT 312 (e.g., the first entry in the GPT 312). In some embodiments, the entry provided in the distributed key entry partition 312a at block 402 may include a descriptor with a variety of attributes for obtaining the network security key and the local security key for accessing the data, determining locations of the data, and/or performing a variety of other secure data operations that would be apparent to one of skill in the art in possession of the present disclosure. For example, the attributes in the descriptor included in that entry may include a local security key pointer to a local system (e.g., a Local Key Management System (LKMS)) along with any information needed to obtain the local security key from that local system, a network security key pointer to a network-based system (e.g., an Enterprise Key Management System (EKMS) such as the key management system 202) along with any information needed to obtain the network security key, a data location pointer to the location of the data that is secured on the data storage partition provided by the storage system 310, a security tag that identifies security requirements for the data that is secured on the data storage partition provided by the storage system 310, a hash value that is configured to allow copies of the data that is secured on the data storage partition provided by the storage system 310 to be retrieved from its source or any destinations where it may be stored, as well as any other attributes that would be apparent to one of skill in the art in possession of the present disclosure.

The security requirements provided in the security tag, which may be provided as one of the attributes for the descriptor in the entry provided in the distributed key entry partition 312a, may include information to identify redundant paths to the same data for recovery purposes (e.g., if source data is lost, it may be recovered from any of the destinations of that data). As such, the security tag may include complete device path information to locate the source data, and any destination data. If multiple copies of the data exist, the source data and all destination data may be hashed to provide a hash value in the security tag for locating redundant data via the network. Such security tag information may be a configurable parameter that identifies how many destinations at which to store the data (e.g., 5 copies of the data), and the security tag associated with any destination data allows all of those destination to be located so that the data can be retrieved.

The security requirements for the security tag may be determined in a variety of manners. For example, the BIOS engine provide by the BIOS 306 may identify the security characteristics currently being provided by the storage system 310 (i.e., when the data is stored in the data storage partition provided on the storage system 310), and provide those security characteristics as the security requirements included in the security tag. In another example, the user of the operating system that created and/or request the storage of the data may define the security requirements for that data, and those security requirements may be provided in the security tag. While a few examples have been described, one of skill in the art in possession of the present disclosure will recognize that the security requirements for the data stored on the data storage partition provided by the storage system 310 may be identified, determined, and/or provided in a variety of manners that will fall within the scope of the present disclosure.

The hash value that is configured to allow copies of the data (which is secured on the data storage partition provided by the storage system 310) to be retrieved from its source or any destinations where it may be stored, and which may be provided as one of the attributes for the descriptor in the entry provided in the distributed key entry partition 312a, may be created by performing a hashing operation on the data, the local security key, and the network security key, with that hash stored in the super block of the GPT 312. As discussed above, the hash value may identify a complete device path to a particular blob of data (including system name/IP/MAC and path to data on disk).

In a specific example of block 402, the BIOS engine provided by the BIOS 306 may identify a data file created by the operating system engine 308, and tag the data file stored on the data storage partition provided by the storage system 310 with a shared local security key (e.g., a local security key provided by an LKMS). The BIOS engine may then create a GPT data file access gate with that local security key and a network security key (e.g., a network security key provided by an EKMS). The BIOS engine may then generate a hash value by performing a hashing operation on the data file, the local security key, and the network security key, and update the super block in the GPT 312 with that hash value. The BIOS engine may then synchronize the GPT 312 with the remote access controller provided by the remote access controller device 304, which may act as a remote access controller group manager (e.g., for a plurality of different remote access controllers in different server devices) that may operate to synchronize the GPT 312 with other remote access controller in other server devices (e.g., the server devices 206b and 206c) via, for example, a remote access controller group manager protocol. As such, following block 402, the data is stored on the data storage partition provided by the storage system 310, and an entry associated with that data is provided in the distributed key entry partition 312a included in the GPT 312 and includes security key information for accessing that data, security requirements for that data, and storage location information for locating the data. Furthermore, any or all of that GPT 312 may be distributed across the storage systems on any number of server devices in the datacenter.

The method 400 then proceeds to block 404 where the first server device receives a request to transfer the data stored on the data storage partition to a second server device. In an embodiment, at block 404, an OS application provided by the operating system engine 308 may generate a request to transfer data stored on the data storage partition in the storage system 310 to a different server device (e.g., from the server device 206a to the server device 206b), and the request to transfer the data will be identified by the multi-location data security subsystem (e.g., provided by the BIOS 306 and/or the remote access controller provided by the remote access controller device 304). In some examples, the request to transfer the data may be provided from a user of the server device 300 via interaction with the OS application. However, in other examples, the request to transfer the data may be received through the network from the second server device (e.g., sent from the server device 206b to the server device 206a). While a few examples have been provided, one of skill in the art in possession of the present disclosure will recognize that the request to transfer the data stored on the data storage partition provided by the storage system 310 may be received in a variety of manners that will fall within the scope of the present disclosure. While in the examples discussed below, the data that is transferred is discussed as being included in a file, data transferred according to the teachings of the present disclosure may be included in a partition, a disk, and/or any other data structure that would be apparent to one of skill in the art in possession of the present disclosure.

The method 400 then proceeds to decision block 406 where the first server device determines whether the second server device satisfies the security requirements identified by the security tag. In an embodiment, at decision block 406, the multi-location data security subsystem (e.g., provided by the BIOS 306 and/or the remote access controller provided by the remote access controller device 304) identifies the data for which the request to transfer was received at block 404, and accesses the distributed key entry partition 312a in the GPT 312 to retrieve the security tag associated with that data in order to determine the security requirements for that data. As such, at decision block 406, the multi-location data security subsystem may identify any security requirements and resulting security provided for the data stored on the data storage partition provided by the storage system 310. The multi-location data security subsystem may then determine the security provided by the second server device to which the data has been requested for transfer. In some examples, when new server devices are added to the datacenter that includes the server device 300, those server devices may report their currently enabled level of data security to the other server devices in the datacenter for storage in their respective GPTs provided in their respective storage systems. As such, in those examples, the GPT 312 in the storage system 310 may include a super block (e.g., the first entry in the GPT 312) in which each server device in the datacenter is identified along with the current level of data security provided by that server device. Furthermore, as the security level provided by server devices in the datacenter changes, those server devices may report their updated data security so that the super block in the GPT 312 may be updated with that updated security information.

In other examples, at decision block 406 and following the identification of the security requirements and resulting security provided for the data stored on the data storage partition provided by the storage system 310, the remote access controller provided by the remote access controller device 304 may communicate with the server device to which the data has been requested for transfer, and retrieve the current data security provided by that server device. However, while a few examples of the determination of the data security provided by a server device (i.e., to which a transfer of data has been requested) has been described, one of skill in the art in possession of the present disclosure will recognize that the determination of data security and data security levels provided by a server device may be performed in a variety of manners that will fall within the scope of the present disclosure as well. Thus, at decision block 406, the multi-location data security subsystem (e.g., provided by the BIOS 306 and/or the remote access controller provided by the remote access controller device 304) may operate to determine whether the current data security provided by the server device to which the transfer of data has been requested satisfies the security requirements identified in the security tag stored in the distributed hidden key table 312a in association with the data that is to-be transferred.

If, at decision block 406, the first server device determines that the second server device satisfies the security requirements identified by the security tag, the method 400 proceeds to block 408 where the first server device transfer the data to the second server device. In an embodiment, at block 408, the BIOS 306 may operate to unlock the data stored in the data storage partition provide by the storage system 310 (e.g., using the security key(s) discussed above), and the remote access controller provided by the remote access controller device 304 may operate to transfer that data through the network 204 to the server device to which the data was requested for transfer. In some embodiments, the security tag associated with that data may be transferred to the server device along with the data, and that data may be stored in a data storage partition provided by a storage system in that server device, with the security tag stored in a distributed key entry partition in that storage system in the same manner as discussed above for the server device 300. However, as discussed above, in other embodiments the GPT 312 may be synchronized between the server devices in the datacenter such that the server device to which the data is transferred at block 408 already stores the security tag for that data in its synchronized GPT. As such, following block 408, the data (e.g., a file, a partition, a disk, etc.) that was that stored on the first server device according to particular security policies/requirements/information is transferred to a second server device after confirming that it will be stored on that second server device according to those same security policies/requirements/information.

If, at decision block 406, the first server device determines that the second server device does not satisfy the security requirements identified by the security tag, the method 400 proceeds to block 410 where the first server device prevents the transfer of the data to the second server device. In an embodiment, at block 410, the BIOS engine provided by the BIOS 306 may operate to prevent the data stored in the data storage partition provided by the storage system 310 from being transferred by the remote access controller provided by the remote access controller device 304 through the network 204 to the server device to which the data was requested for transfer. For example, the BIOS engine may not perform the unlocking of the data using the security keys discussed above, or may prevent access to the data by the remote access controller provided by the remote access controller device 304. However, while a few specific examples of the prevention of the transfer of data to a server device that does not satisfy data security requirements has been described, one of skill in the art in possession of the present disclosure will recognize that data may be prevented from being transferred in a variety of manners that will fall within the scope of the present disclosure as well. As such, block 410 may prevent the transfer of the data (e.g., a file, a partition, a disk, etc.), which was that stored on the first server device according to particular security policies/requirements/information, to a second server device after determining that the second server device is not currently enabling those same security policies/requirements/information.

The method 400 may then proceed to optional block 412 where the first server device identifies security policies for implementation on the second server device in order to satisfy the security requirements identified by the security tag. In an embodiment, at block 412, the remote access controller provided by the remote access controller device 304 may operate to use the security requirements identified for the data at decision block 406 in order to identify security policies for implementation on the server device to which the transfer of data was requested at block 404, which may enable that server device to modify its security polices in order to satisfy the security requirements identified by the security tag for that data. For example, at optional block 412, the remote access controller provided by the remote access controller device 304 may instruct the server device to which the transfer of data was requested at block 404 to activate security policies that satisfy the security requirements for the data that are identified by its security tag, confirm those instructions have been executed, and then transfer the data to that server device. In other examples, the remote access controller provided by the remote access controller device 304 may simply identify security policies that satisfy the security requirements for the data identified by its security tag to the server device to which the transfer of data was requested, and that server device must then activate those security policies (and provide proof of such activation) in order to have the data transferred to that server device.

In other embodiments, rather than the first server device determining that the security requirements for data stored on its storage system are satisfied by a second server device in order to unlock that data and transfer it to that second server device, the first server device may operate to transfer the locked data to the second sever device along with its associated entry from the GPT 312 (which includes the security tag for that data). For example, the remote access controller provided by the remote access controller device 304 may transfer the locked data and its entry in the distributed key entry partition 312a included in the GPT 312 to the second server device via a remote access controller group manager protocol. Following the transfer of the locked data, the second server device may operate to attempt to access that data, and may require that the security requirements included in the security tag in the distributed key entry partition 312a included in the GPT 312 be satisfied before that data will be unlocked (e.g., using the local security key and the network security key discussed above, which in some examples may be retrieved from the LKMS and EKMS.) Furthermore, in embodiments in which remote access controller group manager protocol is not available (e.g., for server devices in different datacenters), an EKMS (e.g., the key management system 202) may be utilized to migrate the entries in the GPT 312 from a first remote access controller group manager (e.g., provided in a server device) in a first datacenter to a second remote access controller group manager (e.g., provided in a server device) in a second datacenter.

As discussed above, the entries in the GPT 312 may include tags/pointers to sources of the data and/or other destinations to which that data has been transferred. As such, in the event the transfer of the data fails for any reason (e.g., the file, disk, partition, or other storage area is lost after data migration), the information about the sources of the data and/or other destinations to which that data has been transferred may be utilized to efficiently recover that data for storage. For example, the security tag for each data/blob which is stored as part of the key entry table will allow for the locating of all redundant copies of same data over the network, along with their associated security requirements.

Thus, systems and methods have been described that provide multi-storage-location data security for data included in files, partitions, disks, and/or other data structures as those data structures are moved between storage locations. A GPT provided in a storage system include GPT entries that point to a GPT distributed key entry partition that stores information about a network security key available from a network-based key management system and information about a local security key available from a local key management subsystem, with the network security key and local security key used to secure the data stored on data storage partition that is include in the storage system and identified in the GPT. When data is provided on data storage partitions included on the storage system and identified by the GPT, entries are added to the GPT distributed key entry partition that include network security key/local security key information combinations, and that are indexed by a super block in the GPT. Each entry in the GPT distributed key entry partition includes a descriptor with attributes that index to the security keys and provide multi-location data security. For example, such attributes may include pointers to systems storing information for retrieving the local security keys used to secure the data, pointers to system storing information for retrieving network security keys used to secure the data, pointers to the secured data, security tags that indicate the security requirements for the secured data, and security hashes that indicate redundant locations of the secured data. The secured data may be secured for a particular level of security or for particular security requirements, and the system operates to prevent the transfer of that data to a storage system that does not have that particular level of security or those particular security requirements enabled, thus providing for multi-storage location data security via the use of a GPT Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A GPT-based multi-location data security system, comprising:
   a first server device; and
   a second server device that is coupled to the first server device through a network, wherein the second server device includes:
      a storage device that includes a Globally Unique Identifier (GUID) Partition Table (GPT) that identifies:
         a data storage partition on the storage device that includes data structures that store data; and
         a distributed key entry partition on the storage device having a respective entry associated with each data structure included on the data storage partition, wherein each respective entry in the distributed key entry partition includes a security tag that identifies security requirements for data stored in the data structure associated with that respective entry; and
      a multi-location data security subsystem that is coupled to the storage device, wherein the multi-location data security subsystem is configured to:
         receive a request to transfer data stored in a first data structure to the first server device;
         access a first security tag that identifies security requirements for the data stored in the first data structure in a first respective entry in the distributed key entry partition that is associated with the first data structure;
         determine, based on the first security tag, whether the first server device satisfies the security requirements for the data stored in the first data structure; and
         transfer, in response to determining that the first server device satisfies the security requirements identified in the first security tag, the data stored in the first data structure to the first server device.

2. The system of claim 1, wherein the storage device is configured to:
   detect the provisioning of data in each data structure included on the data storage partition and, in response, create the security tag that identifies security requirements for the data stored on that data structure, and store that security tag in the respective entry for that data structure in the distributed key entry partition in the GPT.

3. The system of claim 1, wherein the multi-location data security subsystem is configured to:
   transfer the first security tag to the first server device along with the data stored in the first data structure.

4. The system of claim 1, wherein the multi-location data security subsystem is configured to:
   synchronize the GPT with the first server device.

5. The system of claim 1, wherein the multi-location data security subsystem is configured to:
   prevent, in response to determining that the first server device does not satisfy the security requirements identified in the first security tag, the transfer of the data stored in the first data structure to the first server device.

6. The system of claim 5, wherein the multi-location data security subsystem is configured to:
   identify, in response to determining that the first server device does not satisfy the security requirements identified in the first security tag, security policies for implementation on the first server device in order for the first server device to satisfy the security requirements identified in the first security tag.

7. An Information Handling System (IHS), comprising:
   at least one processing system; and
   at least one memory system that is coupled to the at least one processing system and that include instruction that, when executed by the at least one processing system, cause the at least one processing system to perform operations including:
      receiving a request to transfer data to a server device, wherein the data is stored in a first data structure included on a data storage partition that is provided on a storage device and that is identified by a Globally Unique Identifier (GUID) Partition Table (GPT);
      accessing, in a distributed key entry partition that is provided on the storage device and that is identified by the GPT, a first security tag that is included in a first entry associated with the first data structure in the distributed key entry partition, wherein the first security tag identifies security requirements for the data stored in the first data structure;
      determining, based on the security tag, whether the server device satisfies security requirements for the data stored in the first data structure; and
      transferring, in response to determining that the server device satisfies the security requirements identified in the first security tag, the data stored in the first data structure to the server device.

8. The IHS of claim 7, wherein the operations include:
   detecting the storage of the data in the first data structure and, in response, creating the first security tag that identifies the security requirements for the data stored in the first data structure, and storing the first security tag in the first entry associated with the first data structure in the distributed key entry partition.

9. The IHS of claim 7, wherein the operations includes:
   transferring the first security tag to the server device along with the data stored in the first data structure.

10. The IHS of claim 9, wherein the first security tag transferred to the server device identifies at least one source of the data stored in the first data structure.

11. The IHS of claim 7, wherein the operations further include:
    synchronizing the GPT with the server device.

12. The IHS of claim 7, wherein the operations further include:
    preventing, in response to determining that the server device does not satisfy the security requirements identified in the first security tag, the transfer of the data stored in the first data structure to the server device.

13. The IHS of claim 12, wherein the operations further include:
    identifying, in response to determining that the server device does not satisfy the security requirements identified in the first security tag, security policies for implementation on the server device in order for the server device to satisfy the security requirements identified in the first security tag.

14. A method for providing data security at multiple storage locations, comprising:
    receiving, by a first server device, a request to transfer data to a second server device, wherein the data is stored in a first data structure included on a data storage partition that is provided on a storage device and that is identified by Globally Unique Identifier (GUID) Partition Table (GPT);

accessing, by the first server device in a distributed key entry partition that is provided on the storage device and that is identified by the GPT, a first security tag that is included in a first entry associated with the first data structure in the distributed key entry partition, wherein the first security tag identifies security requirements for the data stored in the first data structure;

determining, by the first server device based on the security tag, whether the second server device satisfies security requirements for the data stored in the first data structure included on the data storage partition; and transfer, by the first server device in response to determining that the second server device satisfies the security requirements identified in the first security tag, the data stored in the first data structure to the second server device.

15. The method of claim 14, further comprising:
detecting, by the first server device, the storage of the data in the first data structure and, in response, creating the first security tag that identifies the security requirements for the data stored in the first data structure, and storing the first security tag in the first entry associated with the first data structure in the distributed key entry partition.

16. The method of claim 14, further comprising:
transferring, by the first server device, the first security tag to the second server device along with the data stored in the first data structure.

17. The method of claim 16, wherein the first security tag transferred to the second server device identifies at least one source of the data stored in the first data structure.

18. The method of claim 14, further comprising:
synchronizing, by the first server device, the GPT with the second server device.

19. The method of claim 14, further comprising:
preventing, by the first server device in response to determining that the second server device does not satisfy the security requirements identified in the first security tag, the transfer of the data stored in the first data structure to the second server device.

20. The method of claim 19, further comprising:
identifying, by the first server device in response to determining that the second server device does not satisfy the security requirements identified in the first security tag, security policies for implementation on the second server device in order for the second server device to satisfy the security requirements identified in the first security tag.

* * * * *